Jan. 5, 1954 L. C. YOUNG 2,664,648

GRAPHIC RECORDING DEVICE

Filed March 2, 1951 2 Sheets-Sheet 1

INVENTOR.
LOUIS C. YOUNG
BY Kenway, Jenney, Witter & Hildreth
ATTORNEYS

Jan. 5, 1954

L. C. YOUNG 2,664,648

GRAPHIC RECORDING DEVICE

Filed March 2, 1951

2 Sheets-Sheet 2

INVENTOR.
LOUIS C. YOUNG

BY Kenway, Jenney, Witter & Hildreth

ATTORNEYS

UNITED STATES PATENT OFFICE 2,664,648

GRAPHIC RECORDING DEVICE

Louis C. Young, Bolton, Mass.

Application March 2, 1951, Serial No. 213,606

1 Claim. (Cl. 35—24)

Figure 1:
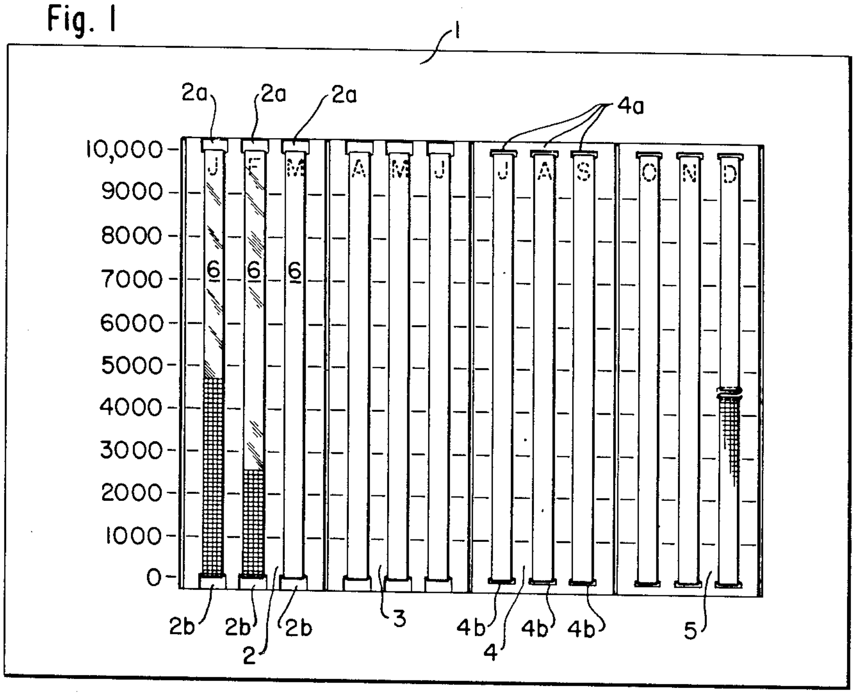

This invention comprises a novel device for recording and presenting data in graphic form continuously in its sequential order over a predetermined period. For the purpose of illustrating my invention I shall assume that the data are to be recorded and presented periodically, e. g. daily, weekly or monthly, in continuous sequence over a period which may be a month, a quarter or a year. It will be understood that other data orders may similarly be recorded on the device of my invention by appropriate modification of its details.

Devices heretofore available for the presentation of ordered data over a predetermined period have typically provided a number of parallel vertically adjustable columns, generally bicolored ribbons ordinarily adjustable to form a bar graph, one for each item of data. The disadvantage of such devices, which it is the principal object of this invention to overcome, is the break in the presentation sequence at the end of the period, when the graph is full. Continued recordation and presentation of data for the next successive period has been possible by eliminating data from the starting end of the graph, but the continuity of presentation and record is not maintained. For ease in comparing data and in determining trends it is distinctly desirable that continued presentation of data may be effected without breaking the presentation sequence.

My invention provides a graphic recording device on which ordered data may be continuously recorded and presented in their proper sequential order. Furthermore, the device of my invention may be used to present data over a periodic interval variable as to its beginning and end.

One embodiment of my invention moreover provides a graph which may be reproduced directly for distribution. A further embodiment has the object of facilitating the direct plotting of data which are the products of quotients of two parameters.

My invention comprises a number of data indicators spacially arranged on appropriate supporting means so that data may be recorded on and by them in sequence over a predetermined period. An important feature of this invention is that the data indicators may be transposed according to their sequence, that is, while maintaining the indicators in their sequential order. The data indicators are conveniently ordinal position indicators arranged on panels which extend in the abscissal direction representing a predetermined period, said panels being transposable in sequence. The data indicators on their supporting panels may accordingly be transposed individually or by sub-periodic groups depending on how many indicators are arranged on a single panel. The panels may be removable and replaceable, rendering them transposable according to their sequence, or they may be formed into an appropriately supported continuous band which permits transposition in sequence.

Figure 2:
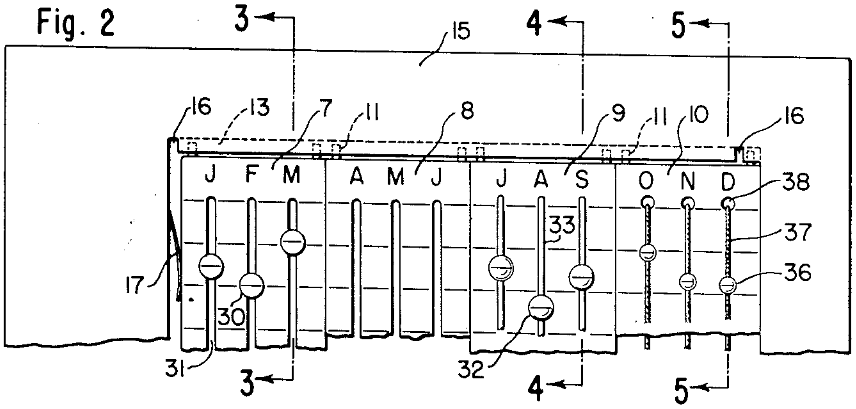
Figure 3:
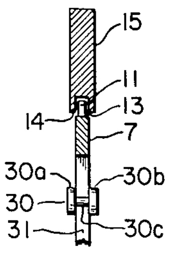
Figure 4:
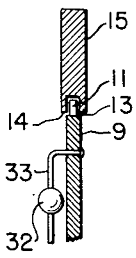
Figure 5:
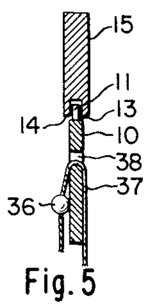
Figure 6:
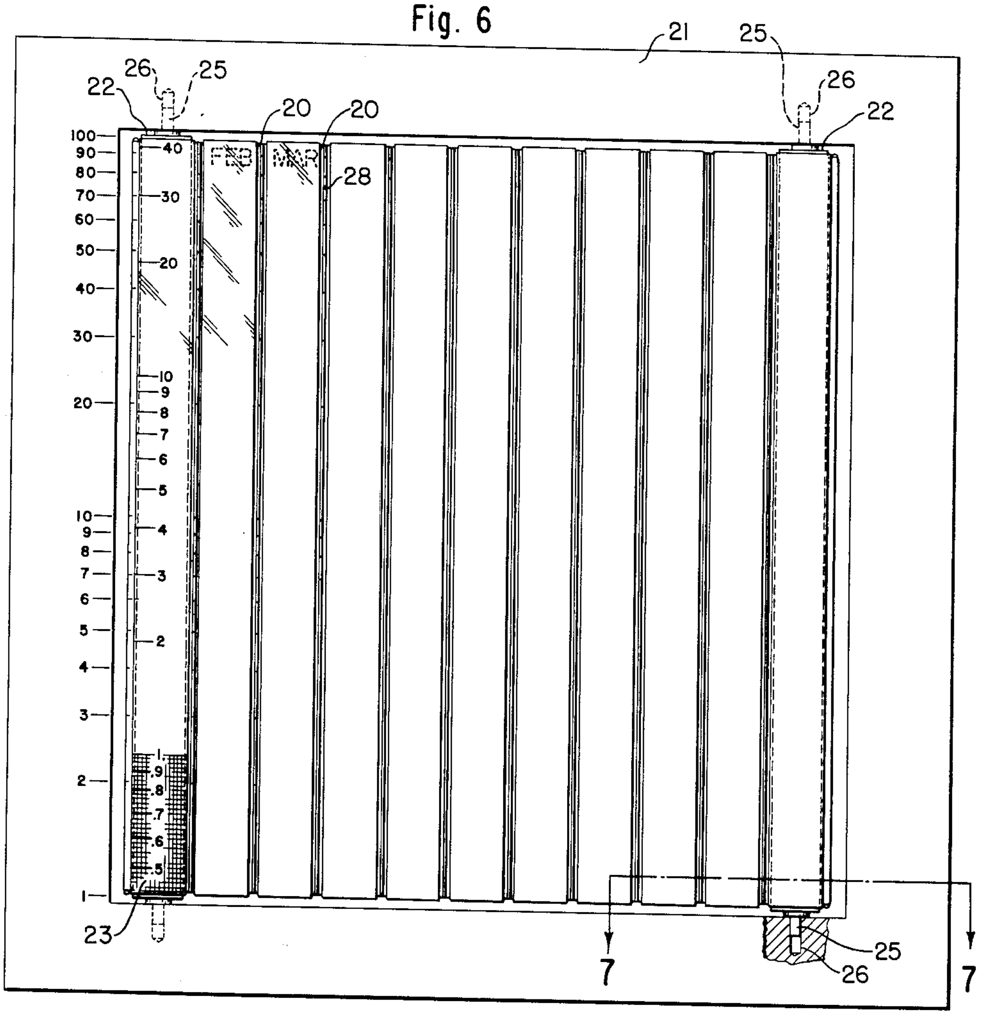
Figure 7:
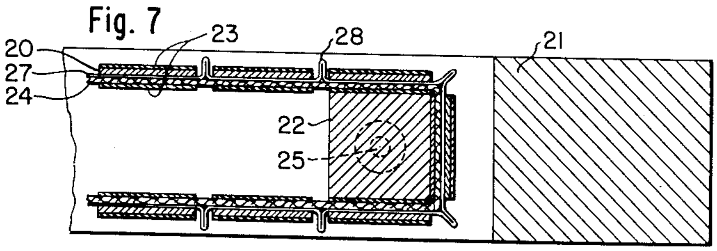
Figure 8:
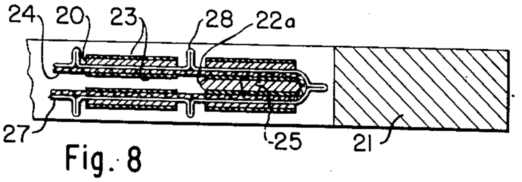

My invention will best be understood from the following detailed description of several embodiments thereof selected for purposes of illustration and shown in the accompanying drawings, in which:

Fig. 1 is a front view showing one embodiment of my invention,

Fig. 2 is a front fragmentary view showing various exemplary structural details of my invention, Fig. 3 is a cross sectional fragmentary view taken along lines 3—3 of Fig. 2, Fig. 4 is a cross sectional fragmentary view taken along lines 4—4 of Fig. 2, Fig. 5 is a cross sectional fragmentary view taken along lines 5—5 of Fig. 2, Fig. 6 is a front view showing one embodiment of my invention with a portion broken away to reveal structural details, Fig. 7 is a cross sectional fragmentary view showing structural details taken along line 7—7 of Fig. 6, and Fig. 8 is a cross sectional fragmentary view showing an alternative structure to that of Fig. 7.

Fig. 1 illustrates a device for presenting data accumulated each month over a period of a year, e. g. monthly sales figures. It includes in its structure a frame 1 having four interchangeable panel members 2, 3, 4 and 5 each adapted to receive data for a quarter. Each panel member 2, 3, 4 and 5 carries three data indicators representing the months, which as herein shown are continuous ribbon loops 6 divided longitudinally into two contrasting color zones, each loop engirding a supporting panel member and longitudinally movable thereon. Preferably one zone of the ribbon is transparent so that indicia on the panels under the ribbons are visible. An ordinal scale indicating sales figure, is imprinted on the side edge of the frame. Monthly sales figures are recorded by positioning each ribbon 6 so that the boundary of color zones is situated ordinally opposite the appropriate sales figure, resulting in a bar graph presentation. When data for a year have been recorded data for the following year may be recorded and presented in continuous sequential order by removing the first quarter panel 2, moving the remaining panels 3, 4 and 5 to the left and replacing the first quarter panel 2 at the right, following the fourth quarter panel 5. Thereby the data are presented in their proper sequence.

The panel members may be retained in the frame by any conventional means. Friction between the edges of the panel and the interior edges of the frame is often sufficient, especially if the panels are made of a tough resilient material, such as sheet plastic. A preferred construction for retaining the panel members within the frame is shown in Figs. 2 and 3. A pair of pins 11—11 extends from each top and bottom edge of each panel, 7, 8, 9 and 10, the pins 11—11 being preferably situated near each end of each of said edges.

The pins 11—11 are retained in grooves 13 provided in the interior edge 14 of the frame 15. It will thus be seen that each panel will be positively retained in the frame while being transversely movable therein. A slot 16 large enough to accommodate the pins 11—11 may be provided near each end of each groove 13 extending from the groove 13 to the face of the frame 15, and through this slot the pins 11—11 may be withdrawn and reinserted when the panel member is transposed. In the device shown the left hand slots are at the extreme left of the groove while the right hand slots are a short distance from the extreme right of the groove. A spring 17 may be provided at the left side edge of the frame to engage the panels and urge them to a position wherein their pins do not align with the slots 16 except when the spring 17 is compressed. Alternatively, if the panel member is of resilient material, it may be flexed thereby causing the pins to be withdrawn from the grooves, releasing the panel member from the frame. If this mode of removability be adopted several pins may be provided on each edge of each panel.

Another embodiment of this invention is shown in Figs. 6, 7 and 8. In this device the panels 20 are connected together in a continuous belt flatly supported within the frame 21 between vertical retainers 22. It will be noted that in this device data may be recorded for two periods, e. g. two years, and presented for one. Continued sequential recording of data after one period may be accomplished by shifting the belt around the retainers to bring into presentation position panel members from the rear of the frame 21. The panels 20 are conveniently fastened to a flexible belt 24. As in the device shown in Figs. 1 and 2 the panels 20 support the data indicators which are conveniently ribbon loops 23. Between each panel 20 is a longitudinal rib or ridge 28, conveniently formed by doubling inter-panel portions of a web 27 interposed between the panels 20 and the belt 24. The ridges 28 define channels for the ribbons 23, thereby positioning them on the panels 20.

The retainers 22 and 22A are preferably axially held rods as shown in Figs. 7 and 8, having prismatic surfaces which engage flat panel members 20 and supporting belt 23 without bending the panels when the belt is shifted. The retainers may accordingly be flat bars 22A as shown in Fig. 8 or square columns 22 as shown in Fig. 7. Pins 25 axially situated at either end of the retainers 22 and accommodated by holes 26 in the interior edges of the frame 21, provide a convenient method of rotationally mounting the retainers 22.

It will be noted that when the belt 24 carrying the panels 20 passes around the square columnar retainer 22 (Fig. 7) one panel is situated midway between the front and back of the frame 21 at each retainer. Accordingly only eleven of the twenty-four panels of Fig. 6 may be presented at one time.

The indicators may be loops of ribbons, ordinally movable, as described above or they may consist of any other movable indicating device, some examples being shown in Figs. 2, 3, 4 and 5. In Fig. 3 and panel 7 of Fig. 2 the indicator comprises a rider 30 mounted in a vertical slit 31 in the panel and slidable therein. The rider conveniently consists of a pair of buttons 30*a* and 30*b* connected by a link 30*c* which passes through the slit 31 and panel 9 of Fig. 2.

In Fig. 4 and panel 9 of Fig. 2 the indicator consists of a bead 32 strung on a wire bail 33 which is held in a vertical (ordinal) position on the panel 9. In Fig. 5 and panel 10 of Fig. 2 the indicator consists of a bead 36 mounted on a cord 37 looped through perforations 38 in said panel 10, the cord being movable around the panel.

When the indicators are ribbon loops as shown in Fig. 1 it is desirable that they are not wedged between the top and bottom edges of the panel members and the interior edges of the frame, so that they may slide freely. The ribbons may be supported between notches 2*a* and 2*b* at the top and bottom of the panel (as shown in panel 2) or between slits 4*a* and 4*b* near the top and bottom of the panel (as shown in panel 4). When pins 11 are provided to retain the panels, as shown in Figs. 2 and 3, they may locate the panel to keep its edges clear of the inside edges of the frame to allow for the passage of ribbons around the panel.

When the recording device utilizes ribbons having two color zones as the data indicators, a modification to facilitate reproduction of the graphic presentation consists in providing one of the color zones with an ink adapted for reproduction processes, e. g. hectograph ink. With such a modification direct reproductions may be made by the alcohol process or the graph may be used in the gelatin process. Many copies of the graphic presentation may then be readily made without resorting to more expensive and time-consuming reproduction processes.

On graphs utilizing ribbons having two color zones which are to be used to record and present data which are the quotients of two parameters, the ordinal index may be graduated logarithmically and imprinted adjacent each ribbon and each ribbon may be imprinted with a corresponding logarithmic scale, the boundary of the two color zones being the index, as indicated in Fig. 6. A quotient may then be plotted directly by aligning the two figures whose quotient is to be plotted, as with a slide rule, the index indicating that quotient. Similarly where a product of two parameters is to be plotted the ribbons may be imprinted with reciprocal logarithmic scales so that when two values are aligned their product is indicated by the index.

It will be seen that my invention provides a novel graphic recording device having great utility and many advantages. The examples of my invention set forth above are selected for purposes of illustration and not by way of limitation. Many modifications of them will be apparent to those skilled in the art, and such modifications may be made without departing from the spirit of my invention. For instance, other forms of data indicators and other methods of retaining the panels in the frame for transposibility may be adopted. Similarly the data indicator may, if desired, be used to indicate abscissal positions while the panels extend and are movable ordinally.

Having thus disclosed my invention and described in detail illustrative embodiments thereof, I claim as new and desire to secure by Letters Patent:

A data presentation device comprising a rectangular frame, grooves along two opposing longitudinal interior edges of said frame, a plurality of panels within said frame, a plurality of pins extending from each of two opposite edges of each panel, said pins engaging said grooves and retaining said panels within said frame, opposed slots in at least one side of said grooves at opposite ends of said frame adapted to allow removal and introduction of said pins from said grooves whereby said panels are transposable continuously in a predetermined sequential order by insertion and removal at opposite ends of the frame longitudinally thereof, and data indicators on said panels.

LOUIS C. YOUNG.

References Cited in the file of this patent

UNITED STATES PATENTS

| Number | Name | Date |
|---|---|---|
| 302,723 | Grimes | July 29, 1884 |
| 349,790 | Gabriel | Sept. 28, 1886 |
| 1,227,661 | Rand | May 29, 1917 |
| 1,338,790 | Renaud | May 4, 1920 |
| 1,554,466 | Stratton | Sept. 22, 1925 |
| 1,623,216 | Szepesi | Apr. 5, 1927 |
| 1,889,006 | Szepesi | Nov. 29, 1932 |
| 2,118,675 | Jackson | May 24, 1938 |
| 2,275,313 | Perenyi | Mar. 3, 1942 |